United States Patent [19]

Poliniak

[11] Patent Number: 4,540,615
[45] Date of Patent: Sep. 10, 1985

[54] HIGH-DENSITY INFORMATION DISC LUBRICANT

[75] Inventor: Eugene S. Poliniak, Willingboro, N.J.
[73] Assignee: RCA Corporation, Princeton, N.J.
[21] Appl. No.: 666,452
[22] Filed: Oct. 30, 1984
[51] Int. Cl.$^3$ .............. G11B 3/70; B32B 3/02
[52] U.S. Cl. ................. 428/64; 428/65; 428/447; 252/49.6; 369/286; 369/288; 369/276; 346/135.1
[58] Field of Search .......... 428/64, 65, 447; 252/49.6; 369/286, 288, 276; 346/135.1

[56] References Cited

U.S. PATENT DOCUMENTS

| | | | |
|---|---|---|---|
| 4,342,659 | 8/1982 | Wang et al. | 252/49.6 |
| 4,342,660 | 8/1982 | Berry et al. | 252/49.6 |
| 4,346,468 | 8/1982 | Preston et al. | 369/276 |
| 4,346,469 | 8/1982 | Hillenbrand et al. | 369/276 |
| 4,351,048 | 9/1982 | Berry | 369/288 |
| 4,355,062 | 10/1982 | Wang et al. | 428/64 |
| 4,383,961 | 5/1983 | Nyman et al. | 264/107 |
| 4,391,720 | 7/1983 | Wang et al. | 252/49.6 |

*Primary Examiner*—Alexander S. Thomas
*Attorney, Agent, or Firm*—Birgit E. Morris

[57] ABSTRACT

Tetraphenyl siloxanes having the formula

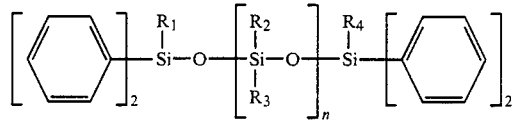

wherein $R_1$ and $R_4$ can be hydrogen or lower alkyl, $R_2$ and $R_3$ can be hydrogen, phenyl or lower alkyl and n is 0 or 1, when added to methyl alkyl siloxane lubricants for high-density information discs, improve the playback performance of the discs.

6 Claims, No Drawings

HIGH-DENSITY INFORMATION DISC LUBRICANT

This invention relates to high-density information disc lubricants. More particularly, this invention relates to methyl alkyl siloxane lubricants containing particular tetraphenyl-substituted siloxane additives which reduce the sensitivity of high-density information discs to moisture.

BACKGROUND OF THE INVENTION

High-density information discs, particularly highly conductive capacitance electronic discs, are lubricated to reduce wear of the playback stylus. Suitable lubricants are known. A methyl alkyl siloxane having the formula

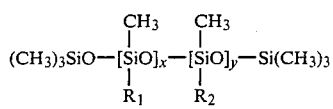

wherein $R_1$ and $R_2$ are alkyl groups of 4–20 carbon atoms, x is an integer of 2–4, y is an integer of 0–2 and wherein the sum of x and y is 4 or less, is particularly preferred because of its excellent lubricity, long wear, and stability to the environment over long periods of time.

However, the siloxanes alone do not overcome a problem of moisture-sensitivity of the disc. The discs are compression-molded from heavily filled plastics that contain a variety of ingredients including for example internal and external lubricants, flow modifiers, conductive fillers and stabilizers. After compression-molding, the disc surface is coated with water-soluble salts that form during the molding process. When the disc is exposed to moisture from the environment, the salts dissolve in the water, and when the water evaporates, the salts reappear, but now as discrete salt deposits rather than as an overall film. These deposits are sufficiently large to interfere with playback of the disc and must be removed. Cleaning the disc to remove the water-soluble salts helps, as is disclosed in U.S. Pat. No. 4,383,961 herein incorporated by reference. Various polar additives have also been added to the lubricant in an effort to reduce moisture sensitivity, known as "carrier distress". For example, preferred dopants, because of their excellent results, are bis(hydroxyalkyl)disiloxanes. These additives, while very effective, have the drawback that they are expensive because of the careful purification procedures that must be performed to make them useful for this application. These procedures are detailed in U.S. Pat. Nos. 4,355,062 and 4,391,720.

Thus the search for alternative additives that are as effective as the bis(hydroxyalkyl)disiloxanes in reducing moisture sensitivity but are less expensive has continued.

SUMMARY OF THE INVENTION

I have found that tetraphenyl-substituted siloxanes having the formula

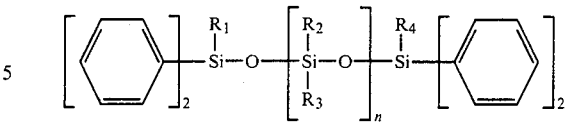

wherein $R_1$ and $R_4$ can be hydrogen or lower alkyl, $R_2$ and $R_3$ can be hydrogen, phenyl or lower alkyl and n is 0 or 1, are excellent additives that reduce moisture sensitivity of high-density information discs. By lower alkyl is meant alkyl groups having 1–5 carbon atoms.

DETAILED DESCRIPTION OF THE INVENTION

The tetraphenyl-substituted siloxanes described hereinabove are commercially available and can be used directly for the present application, without the need for special purification or distillation steps, as additives for methyl alkyl siloxanes lubricants for high-density information discs. An amount of the tetraphenyl-substituted siloxanes is added that will be effective to reduce moisture sensitivity of the discs and can be up to about 50 percent by weight of the combined lubricant. Higher amounts can be employed, but the cost of the discs will be increased thereby. In general, amounts of from about 10 to about 25 percent by weight of the lubricant of the tetraphenyl-substituted siloxane additive are suitable.

The combined lubricants can be admixed with a solvent, such as heptane or heptane mixed with isopropanol, and the discs sprayed or immersed in the solution. Alternatively the methyl alkyl siloxane lubricant and tetraphenyl siloxane additive can be applied by fogging or misting onto the disc's surface, together or separately.

The invention will be further described in the following Examples, but the invention is not meant to be limited to the details described therein. In the Examples parts and percentages are by weight.

Carrier distress time is measured by adding the amount of time in seconds (but discounting intervals of less than 10 microseconds) during record playback when the r.f. output of the player arm is less than 150 millivolts peak to peak and the time when r.f. output gives above 8.6 or below 3.1 megahertz in frequency, indicating a defect. Such defects are noted by the viewer as dropouts. The present acceptable level of carrier distress for a video record is three seconds in one hour of playback time.

Another test of the disc is known as the small skips test. The r.f. output of the player arm normally detects eight consecutively numbered daxi codes for each rotation of the disc. Thus if less than eight daxi codes are noted per rotation, a computer attached to the player determines the number of daxi codes missed and then computes the number of grooves skipped. The number of times during one hour of playback that eight grooves or less are skipped (one small skip event) is monitored. The present acceptable level of small skip events is 30 per one hour of playback.

EXAMPLE 1

Commercial capacitance electronic discs that have been washed after pressing with a solution containing

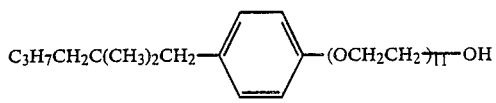

humidity for one hour, replayed and tested, and the stress and playback repeated.

The tests were repeated using commercial capacitance electronic discs that had not been washed, however; i.e., discs directly from the presses. The playback data for these discs are summarized in Table IA.

TABLE I

| Amount of Additive | Initial Play | | | After 1st Stress | | | After 2nd Stress | | |
|---|---|---|---|---|---|---|---|---|---|
| | Median | Range | # Passed | Median | Range | # Passed | Median | Range | # Passed |
| WASHED | | | | | | | | | |
| Carrier Distress, Secs./Hour of Play | | | | | | | | | |
| 10% | 0.6 | 0.5–2.7 | 11/11 | 0.5 | 0.2–191 | 10/12 | 0.6 | 0.2–178 | 10/12 |
| 25% | 0.5 | 0.1–1.0 | 12/12 | 0.4 | 0.1–0.8 | 12/12 | 0.5 | 0.2–1.1 | 12/12 |
| Control | 0.6 | 0.3–1.0 | 11/11 | 0.5 | 0.2–0.8 | 12/12 | 0.5 | 0.1–0.6 | 12/12 |
| Skips, # per Hour of Play | | | | | | | | | |
| 10% | 55 | 13–324 | 4/11 | 25 | 2–262 | 6/12 | 25 | 0–406 | 7/12 |
| 25% | 70 | 12–234 | 1/12 | 25 | 6–76 | 6/12 | 14 | 4–768 | 8/12 |
| Control | 57 | 8–424 | 3/11 | 36 | 2–3450 | 4/12 | 14 | 0–34 | 10/12 |
| AS-PRESSED | | | | | | | | | |
| Carrier Distress, Secs./Hour of Play | | | | | | | | | |
| 10% | 0.7 | 0.3–15 | 11/12 | 11 | 1.3–33 | 2/12 | 4.8 | 0.5–12 | 7/12 |
| 25% | 0.5 | 0.2–4.5 | 12 | 2.9 | 0.2–19 | 6/12 | 0.7 | 0.2–6.3 | 9/12 |
| Control | 0.5 | 0.4–0.7 | 12/12 | 0.9 | 0.3–19 | 7/12 | 0.6 | 0.2–29 | 11/12 |
| Skips, # per Hour of Play | | | | | | | | | |
| 10% | 96 | 0–450 | 1/12 | 47 | 20–128 | 5/12 | 24 | 6–90 | 7/12 |
| 25% | 72 | 12–226 | 3/12 | 23 | 0–84 | 7/12 | 28 | 10–56 | 6/12 |
| Control | 71 | 28–120 | 1/12 | 52 | 0–264 | 3/12 | 34 | 0–96 | 5/12 | were sprayed with mixtures of methyl decyl siloxane that had been molecularly distilled and that fraction distilling between 100°–205° C. collected, and 1,1,5,5-tetraphenyl-1,3,3,5-tetramethyl trisiloxane having the formula

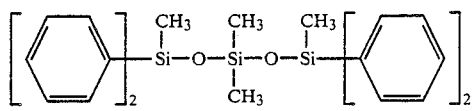

and a viscosity of 38 centistokes, which is commercially available from Petrarch Systems, Inc.

These discs were compared to control discs that were sprayed with the same methyl alkyl siloxane lubricant containing 10 percent by weight of bis(hydroxybutyl)-disiloxane.

The data for playback are summarized below in Table 1. The discs were played once, stressed by placing in a chamber held at 100° F. and 95 percent relative

EXAMPLE 2

The procedure of Example 1 was repeated except substituting as the lubricant additive 1,1,3,3-tetraphenyl-1,3-dimethyldisiloxane having the formula

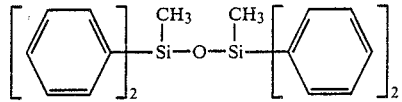

and a viscosity of 94 centistokes, also available from Petrarch Systems, Inc.

The playback data are summarized below in Tables II and IIA for washed and as-pressed discs, respectively.

TABLE II

| Amount of Additive | Initial Play | | | After 1st Stress | | | After 2nd Stress | | |
|---|---|---|---|---|---|---|---|---|---|
| | Median | Range | # Passed | Median | Range | # Passed | Median | Range | # Passed |
| WASHED | | | | | | | | | |
| Carrier Distress, Secs./Hour of Play | | | | | | | | | |
| 10% | 0.4 | 0.3–0.6 | 11/11 | 0.5 | 0.3–4.6 | 11/11 | 0.4 | 0.2–0.6 | 12/12 |
| 25% | 0.6 | 0.3–25 | 9/11 | 0.4 | 0.3–1.0 | 12/12 | 0.5 | 0.2–0.7 | 12/12 |
| Control | 0.6 | 0.3–1.0 | 11/11 | 0.5 | 0.2–0.8 | 12/12 | 0.5 | 0.1–0.6 | 12/12 |
| Skips, # per Hour of Play | | | | | | | | | |
| 10% | 42 | 22–196 | 3/11 | 31 | 6–140 | 5/12 | 28 | 6–114 | 6/12 |
| 25% | 45 | 20–228 | 2/11 | 26 | 8–58 | 7/11 | 21 | 8–56 | 8/12 |
| Control | 57 | 8–424 | 3/11 | 36 | 2–3450 | 4/12 | 14 | 0–34 | 10/12 |
| AS PRESSED | | | | | | | | | |
| Carrier Distress, Secs./Hour of Play | | | | | | | | | |
| 10% | 0.5 | 0.3–4.0 | 10/12 | 6.2 | 0.6–22 | 3/12 | 1.6 | 0.4–266 | 7/12 |
| 25% | 0.6 | 0.3–1.0 | 11/11 | 12 | 0.4–38 | 1/11 | 3.9 | 0.3–22 | 5/12 |
| Control | 0.5 | 0.4–0.7 | 12/12 | 0.9 | 0.3–19 | 7/12 | 0.6 | 0.2–29 | 11/12 |
| Skips, # per Hour of Play | | | | | | | | | |
| 10% | 61 | 20–402 | 3/12 | 44 | 0–288 | 5/12 | 29 | 2–92 | 6/12 |
| 25% | 54 | 16–102 | 2/12 | 37 | 2–70 | 4/12 | 22 | 2–64 | 9/12 |
| Control | 71 | 28–120 | 1/12 | 52 | 0–264 | 3/12 | 34 | 0–96 | 5/12 |

EXAMPLE 3

The procedure of Example 1 was followed except substituting as the lubricant additive 1,1,3,5,5-pentaphenyl-1,2,3-trimethyl trisiloxane having the formula

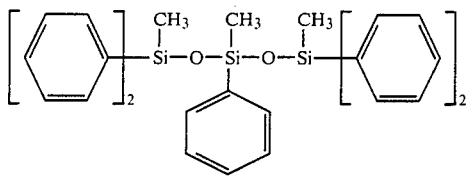

and a viscosity of 175 centistokes, commercially available from Petrarch Systems, Inc.

The playback data are summarized below in Tables III and IIIA for washed and as-pressed discs, respectively.

TABLE III

| Amount of Additive | Initial Play | | | After 1st Stress | | | After 2nd Stress | | |
|---|---|---|---|---|---|---|---|---|---|
| | Median | Range | # Passed | Median | Range | # Passed | Median | Range | # Passed |
| WASHED | | | | | | | | | |
| Carrier Distress, Secs./Hour of Play | | | | | | | | | |
| 10% | 0.5 | 0.3–1.4 | 11/11 | 0.6 | 0.1–2.0 | 12/12 | 0.5 | 0.2–58 | 10/12 |
| 25% | 0.6 | 0.4–4.7 | 9/11 | 0.5 | 0.3–4.0 | 11/12 | 0.9 | 0.2–2.7 | 12/12 |
| Control | 0.6 | 0.3–1.0 | 11/11 | 0.5 | 0.2–0.8 | 12/12 | 0.5 | 0.1–0.6 | 12/12 |
| Skips, # per Hour of Play | | | | | | | | | |
| 10% | 49 | 2–486 | 4/11 | 21 | 2–226 | 7/12 | 23 | 0–8012 | 8/12 |
| 25% | 61 | 26–318 | 1/11 | 54 | 8–508 | 3/12 | 98 | 8–958 | 1/12 |
| Control | 57 | 8–424 | 3/11 | 36 | 2–3450 | 4/12 | 14 | 0–34 | 10/12 |
| AS-PRESSED | | | | | | | | | |
| Carrier Distress, Secs./Hour of Play | | | | | | | | | |
| 10% | 0.5 | 0.3–8.4 | 10/11 | 8 | 1.8–26 | 1/12 | 2.4 | 0.3–5.2 | 7/12 |
| 25% | 0.6 | 0.3–0.8 | 12/12 | 6.5 | 1.1–46 | 3/12 | 6.7 | 0.3–26 | 5/12 |
| Control | 0.5 | 0.4–0.7 | 12/12 | 0.9 | 0.3–19 | 7/12 | 0.6 | 0.2–29 | 11/12 |
| Skips, # per Hour of Play | | | | | | | | | |
| 10% | 38 | 22–3190 | 2/11 | 32 | 8–188 | 5/12 | 24 | 12–7362 | 7/12 |
| 25% | 70 | 36–118 | 0/12 | 45 | 10–356 | 3/12 | 62 | 12–11890 | 2/12 |
| Control | 71 | 28–120 | 1/12 | 52 | 0–264 | 3/12 | 34 | 0–96 | 5/12 |

It is apparent that the presently described additives are comparable to the control for playback. Since they are less expensive than the control additive, high-density information discs can be made according to the present invention which have good performance and lower cost that at present.

I claim:

1. In a high-density information record having a methyl alkyl siloxane lubricant on a surface thereof, the improvement comprising adding to said lubricant an effective amount of a tetraphenyl siloxane having the formula

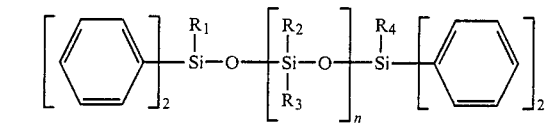

wherein $R_1$ and $R_4$ can be hydrogen or lower alkyl, $R_2$ and $R_3$ can be hydrogen, phenyl or lower alkyl and n is 0 or 1.

2. a record according to claim 1 wherein the tetraphenyl siloxane has the formula

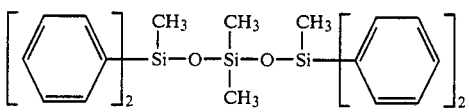

3. A record according to claim 1 wherein the tetraphenyl siloxane has the formula

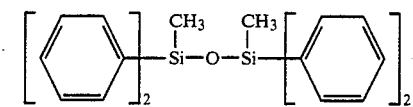

4. A record according to claim 1 wherein the tetraphenyl siloxane has the formula

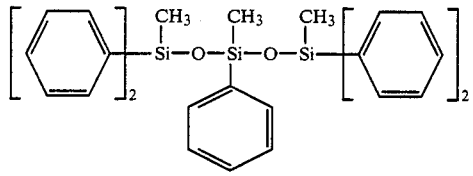

5. A record according to claim 1 wherein the record has a conductivity sufficient for capacitive playback.

6. A record according to claim 1 wherein the tetraphenyl siloxane additive is present in an amount of between about 10 and 25 percent by weight of the methyl alkyl siloxane lubricant.

* * * * *